(12) United States Patent
Sanchez et al.

(10) Patent No.: US 11,379,655 B1
(45) Date of Patent: *Jul. 5, 2022

(54) SYSTEMS AND METHODS FOR AUTOMATICALLY SERIALIZING AND DESERIALIZING MODELS

(71) Applicant: BlueOwl, LLC, Bloomington, IL (US)

(72) Inventors: Kenneth Jason Sanchez, San Francisco, CA (US); Michael Kim, Fairfax, VA (US)

(73) Assignee: BlueOwl, LLC, San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/784,921

(22) Filed: Oct. 16, 2017

(51) Int. Cl.
*G06F 40/186* (2020.01)
*G06N 20/00* (2019.01)
*G06F 40/14* (2020.01)
*G06F 40/117* (2020.01)
*G06Q 40/08* (2012.01)

(52) U.S. Cl.
CPC .......... *G06F 40/186* (2020.01); *G06F 40/117* (2020.01); *G06F 40/14* (2020.01); *G06N 20/00* (2019.01); *G06Q 40/08* (2013.01)

(58) Field of Classification Search
CPC .......... G06F 17/24; G06F 17/25; G06T 11/60; A63F 2300/5553; A63F 2300/6623
USPC ................. 715/201, 202, 230, 255
See application file for complete search history.

(56) References Cited

U.S. PATENT DOCUMENTS

| | | | |
|---|---|---|---|
| 8,136,109 B1 | 3/2012 | Birdeau et al. | |
| 8,380,785 B2 | 2/2013 | Grateau et al. | |
| 8,601,495 B2 | 12/2013 | Bezukov | |
| 8,694,947 B1* | 4/2014 | Venkataramani | G06F 30/327 716/132 |
| 9,454,630 B1 | 9/2016 | Lee et al. | |
| 10,510,219 B1 | 12/2019 | Zalewski et al. | |
| 10,545,969 B2 | 1/2020 | Ball et al. | |
| 2006/0269148 A1 | 11/2006 | Farber et al. | |
| 2008/0295003 A1* | 11/2008 | Behl | G06F 16/954 715/760 |
| 2009/0240539 A1 | 9/2009 | Slawson et al. | |
| 2009/0248494 A1 | 10/2009 | Hueter et al. | |
| 2010/0145902 A1 | 6/2010 | Boyan et al. | |
| 2012/0072469 A1 | 3/2012 | Perez et al. | |

(Continued)

FOREIGN PATENT DOCUMENTS

CN 106874244 A * 6/2017

OTHER PUBLICATIONS

Google. Google Patents, <https://patents.google.com/>. 2020. (Year: 2020).

*Primary Examiner* — Ariel Mercado
*Assistant Examiner* — Jenq-Kang Chu
(74) *Attorney, Agent, or Firm* — Faegre Drinker Biddle & Reath LLP

(57) ABSTRACT

A system serializing and deserializing models configured to (i) store a first model, wherein the first model includes a plurality of functionalities; (ii) generate a human-readable document based on the first model, wherein the human-readable document describes the first model; (iii) generate a second model based on the human-readable document, wherein the second model includes the plurality of functionalities; and (iv) perform at least one execution of the second model.

15 Claims, 6 Drawing Sheets

(56) References Cited

U.S. PATENT DOCUMENTS

| | | | |
|---|---|---|---|
| 2012/0131612 A1* | 5/2012 | Liu | H04N 21/8355 |
| | | | 725/39 |
| 2012/0172025 A1 | 7/2012 | Haemaelaeinen et al. | |
| 2013/0110666 A1 | 5/2013 | Aubrey | |
| 2013/0110818 A1 | 5/2013 | O'Brien-Strain et al. | |
| 2013/0191328 A1* | 7/2013 | Hackmann | G06F 16/258 |
| | | | 707/609 |
| 2014/0068553 A1* | 3/2014 | Balasubramanian | G06F 8/34 |
| | | | 717/109 |
| 2015/0093021 A1 | 4/2015 | Xu et al. | |
| 2015/0339572 A1 | 11/2015 | Achin et al. | |
| 2016/0004516 A1* | 1/2016 | Ivanov | G06F 8/35 |
| | | | 717/106 |
| 2016/0078361 A1 | 3/2016 | Brueckner et al. | |
| 2016/0342685 A1 | 11/2016 | Basu et al. | |
| 2016/0350093 A1 | 12/2016 | Walker et al. | |
| 2016/0350153 A1 | 12/2016 | Khot et al. | |
| 2016/0352803 A1 | 12/2016 | Amiga et al. | |
| 2017/0300472 A1 | 10/2017 | Parikh et al. | |
| 2018/0025276 A1 | 1/2018 | Hill et al. | |
| 2018/0053204 A1 | 2/2018 | Mohanty et al. | |
| 2018/0121392 A1 | 5/2018 | Zhang et al. | |
| 2018/0129637 A1* | 5/2018 | Lantwin | G06F 40/151 |
| 2018/0181808 A1 | 6/2018 | Sridharan | |
| 2018/0246708 A1* | 8/2018 | Benton | G06F 8/47 |
| 2018/0336640 A1 | 11/2018 | Dziabiak et al. | |
| 2019/0005018 A1 | 1/2019 | Sharma et al. | |
| 2019/0108419 A1 | 4/2019 | Coven et al. | |
| 2019/0354575 A1* | 11/2019 | Petti | G06F 8/40 |
| 2019/0370477 A1 | 12/2019 | Agarwal | |
| 2019/0385237 A1 | 12/2019 | Wetton et al. | |

\* cited by examiner

SYSTEMS AND METHODS FOR AUTOMATICALLY SERIALIZING AND DESERIALIZING MODELS

FIELD OF THE INVENTION

The present disclosure relates to automatically serializing and deserializing models and, more particularly, to a network-based system and method for automatically serializing a model into a human-readable document and then automatically deserializing the human-readable document back into a working model.

BACKGROUND

In some cases, companies are required to provide human-readable descriptions of their models for review, such as to regulators. In these cases, the regulators then review the models by reviewing the human-readable descriptions. As the models represent the company's planned behavior, accuracy of the human-readable description of the models may be highly important. If there is an error in the human-readable description or a difference between the description and the model, the company may be required to provide a new description or may incur some other penalty. The inability to accurately and efficiently generate a human-readable description of a model for regulation or other review can be quite costly from a delay and expense perspective.

BRIEF SUMMARY

The present embodiments may relate to systems and methods for automatically serializing and deserializing models. The platform may include a serialization computer system, a deserialization computer system, and/or a plurality of user computer devices.

In one aspect, a computer system for automatically serializing and deserializing models may be provided. The computer system may include at least one processor in communication with at least one memory device. The at least one processor may be programmed to store a first model. The first model may include a plurality of functionalities. The at least one processor may also be programmed to serialize the first model by generating a human-readable, model descriptive document based on the first model. The human-readable document may describe the first model. The first model being a computer-operable model. The first model being configured to be executed by the at least one processor. The at least one processor may further be programmed to generate a second model by deserializing the human-readable document. The second model includes the plurality of functionalities. The second model is a computer-operable model that is configured to be executed by the at least one processor to generate an output of the second model. The output of the first model and the output of the second model are the same. In addition, the at least one processor may also be programmed to perform at least one execution of the second model to facilitate providing the user with accurate human-readable descriptions that match the computer-operable second model. The computer-operable model being configured to perform operations to provide the same output as the first model. The computer system may have additional, less, or alternate functionalities, including that discussed elsewhere herein.

In one aspect, a computer system for automatically serializing and deserializing models may be provided. The computer system may include at least one processor in communication with at least one memory device. The at least one processor may be programmed to store a first model. The first model may include a plurality of functionalities. The at least one processor may also be programmed to generate a human-readable document based on the first model. The human-readable document may describe describes the first model. The at least one processor may further be programmed to generate a second model based on the human-readable document. The second model includes the plurality of functionalities. In addition, the at least one processor may also be programmed to perform at least one execution of the second model to facilitate providing the user with accurate human-readable descriptions of the model. The computer system may have additional, less, or alternate functionalities, including that discussed elsewhere herein.

In another aspect, a computer-based method for automatically serializing and deserializing models may be provided. The method may be implemented on a serialization/deserialization ("SD") computer device including at least one processor in communication with at least one memory device. The method may include storing, in the memory device, a first model. The first model may include a plurality of functionalities. The method may also include generating, by the processor, a human-readable document based on the first model. The human-readable document may describe the first model. The method may further include generating, by the processor, a second model based on the human-readable document. The second model may include the plurality of functionalities. In addition, the method may include performing at least one execution of the second model to facilitate providing the user with accurate human-readable descriptions of the model. The method may have additional, less, or alternate functionalities, including that discussed elsewhere herein.

In yet another aspect, at least one non-transitory computer-readable storage media having computer-executable instructions embodied thereon may be provided. When executed by at least one processor, the computer-executable instructions may cause the processor to store a first model. The first model may include a plurality of functionalities. The computer-executable instructions may also cause the processor to generate a human-readable document based on the first model. The human-readable document may describe the first model. The computer-executable instructions may further cause the processor to generate a second model based on the human-readable document. The second model may include the plurality of functionalities. In addition, the computer-executable instructions may cause the processor to perform as least one execution of the second model to facilitate providing the user with accurate human-readable descriptions of the model. The computer-readable storage media may have additional, less, or alternate functionalities, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
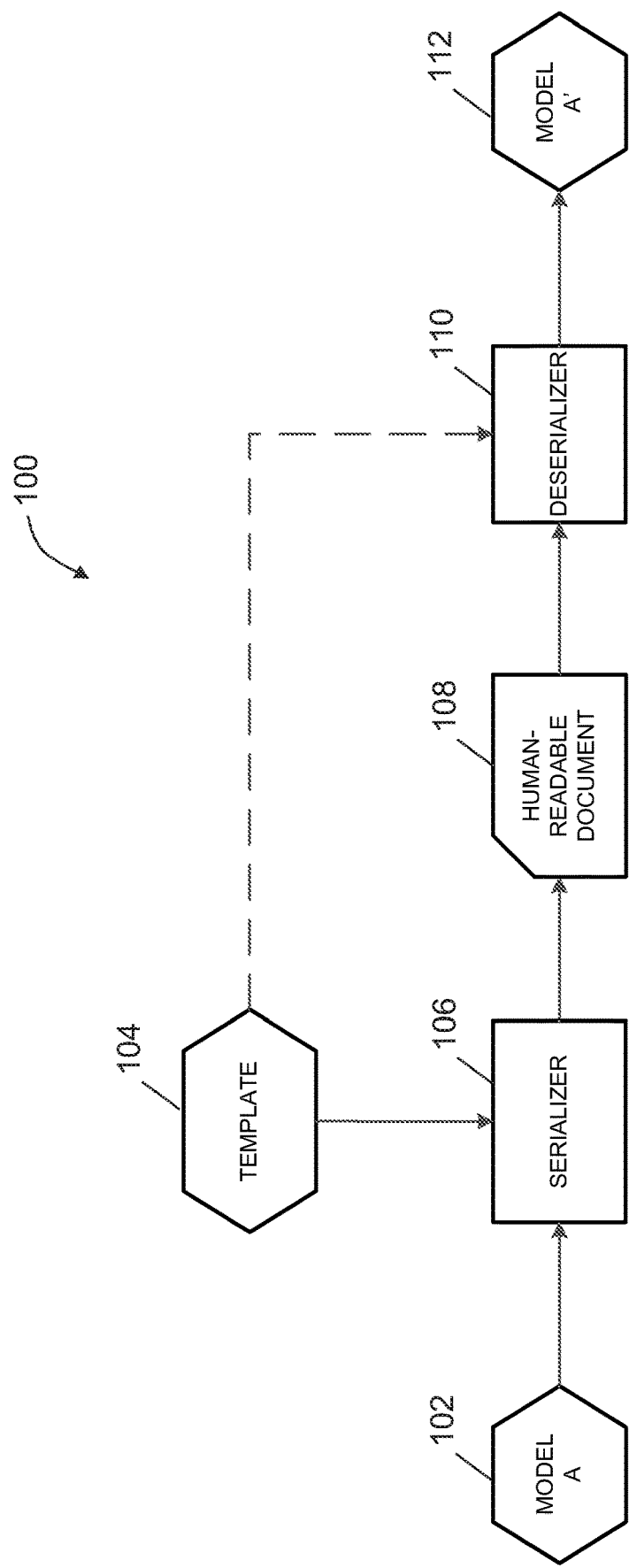
FIG. 1 illustrates a flow chart of an exemplary process of serializing and deserializing models.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for automatically serializing and deserializing models. In one exemplary embodiment, the methods may be performed by a serialization/deserialization ("SD") computer device, also known as a serialization/deserialization ("SD") server.

In the exemplary embodiment, the SD server may combine the functions of a serializer and a deserializer. In other embodiments, serializer and deserializer may be separate computer devices.

In the exemplary embodiment, one or more models may need to be serialized. In the exemplary embodiment, a model A may be a computer executable model. Model A may be configured with a plurality of parameters and/or settings that may be adjusted. Model A may be configured to accept a plurality of inputs, such as a data set and generate an output based on the plurality of inputs and the plurality of parameters and/or settings.

In the exemplary embodiment, one or more templates may have been prepared. The templates may include a plurality of text, a plurality of placeholders, and a plurality of tags for items to be converted into text. Each template may be configured to receive a plurality of tagged inputs to place in the plurality of placeholders. In the exemplary embodiment, the template may be configured to generate a complete human-readable model description when the plurality of placeholders are filled in. Placeholders may be for as little as one or two words, such as a label, and for as much as a plurality of pages. Placeholders may also be for tables of coefficients, formula, labels, titles, descriptions, and/or any other information that may need to be conveyed in the description to be generated. In some embodiments, an individual tag may be associated with multiple locations in the template.

In the exemplary embodiment, a serializer receives model A and the corresponding template. In some embodiments, the serializer may receive a plurality of templates for a plurality of human-readable, model description documents. In these embodiments, the serializer may receive a user selection of which template to use. In other embodiments, the serializer may receive a user selection of which human-readable, model description document to produce and determine which template to use based on the selected document and model A.

In the exemplary embodiment, the serializer compares model A to the plurality of tags in the template to identify which features and/or portions of model A match one or more tags. For example, the serializer may search model A for a title or a specific label. If the serializer locates the title or label in model A, then the serializer may associate that item with the tag. The serializer may then apply that item to every place associated with the corresponding tag in the template.

By applying items to the tags, the serializer generates a human-readable, model description document. In the exemplary embodiment, the human-readable document describes the model. In some embodiments, the human-readable document is a filled out form or a standardized report. In some further embodiments, the human-readable document is built in accordance with one or more rules or guidelines.

In the exemplary embodiment, a deserializer is configured to convert the human-readable document into Model A'. Model A' is configured to include the same functionality as Model A. In the exemplary embodiment, Model A is serialized into a human-readable document and then deserialized into Model A'. Model A' is configured to be executed by a computer device to produce outputs similar to how Model A does. In the exemplary embodiment, a data set is executed on both Model A and Model A' to test that Model A' matches Model A. The outputs of both Model A and Model A' are compared. In some embodiments, an accuracy level is determined based on the comparison.

In the exemplary embodiment, the deserializer reads the data provided in the human-readable document and translates that information into Model A'. In some embodiments, deserializer also uses the template to generate Model A'.

Deserializing the human-readable document ensures that Model A' accurately matches the documented model to prevent any potential confusion about whether or not all of the features of Model A are accurately portrayed in human-readable document.

In some embodiments, the conversion process may be automatically performed on Model A and human-readable document and Model A' are provided as outputs. In other embodiments, the conversion process is broken up into segments, where the human-readable document is provided first and Model A' is generated at a later time based on the human-readable document.

At least one of the technical problems solutions provided by this system may include: (i) improving speed and accuracy of providing model descriptions; (ii) confirming the accuracy of the human-readable model descriptions; (iii) reduce the time to create model descriptions; and/or (iv) ensure the accuracy of models based on human-readable documents.

The methods and systems described herein may be implemented using computer programming or engineering techniques including computer software, firmware, hardware, or any combination or subset thereof, wherein the technical effects may be achieved by performing at least one of the following steps: (a) store a first model, wherein the first model includes a plurality of functionalities; (b) receive a plurality of data sets; (c) train the first model based on the plurality of data sets; (d) receive a template, wherein the template includes a plurality of tags; (e) compare the template to the first model; (f) compare each tag of the plurality of tags to the first model to identify a feature of the first model that matches the corresponding tag; (g) apply the feature to at least one location associated with the tag; (h) generate the human-readable document based on the comparison; (i) generate a human-readable document based on the first model, wherein the human-readable document describes the first model; (j) generate a second model based on the human-readable document, wherein the second model includes the plurality of functionalities; (k) generate the second model based on the template and the human-readable document; (l) identify the features associated with tags based on the template; (m) generate the second model to include the features associated with tags and to exclude text not associated with tags; and (o) perform at least one execution of the second model.

The technical effects may be also achieved by performing at least one of the following steps: (a) store a plurality of templates, wherein each template is based on a different human-readable document; (b) receive a user selection of a template of the plurality of templates; (c) generate the human-readable document based on the user-selected template and the first model; (d) receive a plurality of data sets; (e) execute the first model based on the plurality of data sets to receive a first plurality of results; (f) execute the second model based on the plurality of data sets to receive a second plurality of results; and (g) compare the first plurality of results with the second plurality of results to determine an accuracy of the second model.

Exemplary Process for Managing Usage-Based Insurance

FIG. 1 illustrates a flow chart of an exemplary computer-implemented process 100 for automatically serializing and deserializing models.

In the exemplary embodiment, one or more models (model A 102) may need to be serialized. In the exemplary embodiment, model A 102 may be a computer executable model. Model A 102 may be configured with a plurality of parameters and/or settings that may be adjusted. Model A 102 may be configured to accept a plurality of inputs, such as a data set and generate an output based on the plurality of inputs and the plurality of parameters and/or settings. Examples of models include, but are not limited to, neural networks, tree-based models, linear models, linear regression models, and other models known to those of ordinary skill in the art.

In the exemplary embodiment, one or more templates 104 may have been prepared. The templates 104 may include a plurality of text, a plurality of placeholders, and a plurality of tags for items to be converted into text. The template 104 may be configured to receive a plurality of tagged inputs to place in the plurality of placeholders. In the exemplary embodiment, template 104 may be configured to generate a complete description of the model when the plurality of placeholders are filled in. Placeholders may be for as little as one or two words, such as a label, and for as much as a plurality of pages. Placeholders may also be for tables of coefficients, formula, labels, titles, descriptions, and/or any other information that may need to be conveyed in the description to be generated. In some embodiments, an individual tag may be associated with multiple locations in template 104.

In the exemplary embodiment, a serializer 106 receives model A 102 and the template 104. In some embodiments, serializer 106 may receive a plurality of templates 104 for a plurality of human-readable, model description documents. In these embodiments, serializer 106 may receive a user selection of which template to use. In other embodiments, serializer 106 may receive a user selection of which human-readable, model description document to produce and determine which template 104 to use based on the selected document and model A 102.

In the exemplary embodiment, serializer 106 compares model A 102 to the plurality of tags in template 104 to identify which features and/or portions of model A 102 match one or more tags. For example, serializer 106 may search model A 102 for a title or a specific label. If serializer 106 locates the title or label in model A 102, then serializer 106 may associate that item with the tag. Serializer 106 may then apply that item to every place associated with the corresponding tag in the template 104.

By applying items to the tags, serializer 106 generates a human-readable, model description document 108. In the exemplary embodiment, human-readable, model description document 108 describes the model. In some embodiments, human-readable document 108 is a filled out form or a standardized report. In some further embodiments, human-readable document 108 is built in accordance with one or more rules or guidelines.

In the exemplary embodiment, a deserializer 110 is configured to convert the human-readable document 108 into Model A' 112. Model A' 112 is configured to include the same functionality as Model A 102. In the exemplary embodiment, Model A 102 is serialized into human-readable document 108 and then deserialized into Model A' 112. Model A' 112 is configured to be executed by a computer device to produce outputs similar to how Model A 102 does. In the exemplary embodiment, a data set is executed on both Model A 102 and Model A' 112 to test that Model A' 112 matches Model A 102. The outputs of both Model A 102 and Model A' 112 are compared. In some embodiments, an accuracy level is determined based on the comparison.

In the exemplary embodiment, deserializer 110 reads the data provided in human-readable document 108 and translates that information into Model A' 112. In some embodiments, deserializer 110 also uses template 104 to generate Model A' 112. By deserializing the human-readable document 108, process 100 ensures that Model A' 112 is accurately matches the documented model to prevent any potential confusion about whether or not all of the features of Model A 102 are accurately portrayed in human-readable document 108.

In some embodiments, process 100 may be automatically performed on Model A 102 and human-readable document 108 and Model A' 112 are provided as outputs. In other embodiments, process 100 is broken up into segments, where human-readable document 108 is provided first and Model A' 112 is generated at a later time based on human-readable document 108.

In some further embodiments, serializer 106 embeds a series of hidden identifiers and tags in human-readable document 108. Deserializer 110 may then convert human-readable document 108 into Model A' 112 based on the embedded identifiers and tags. For example, human-readable document 108 may include the following text: {@<model_id:18921>,<function_id:18912} "for the next step, multiply together age by 10." {@end}. In this example the text between the { } is hidden in human-readable document. Based on this example, deserializer 110 may parse out a variable "age" and the number 10. Deserializer 110 may further return a function such as function_18912 (age): return age*10. In these embodiments, deserializer 110 may convert human-readable document 108 into Model A'112 based on the tags and the identifiers within human-readable document 108, instead of using a template.

Exemplary Computer-Implemented Method for Managing Insurance

Figure 2:
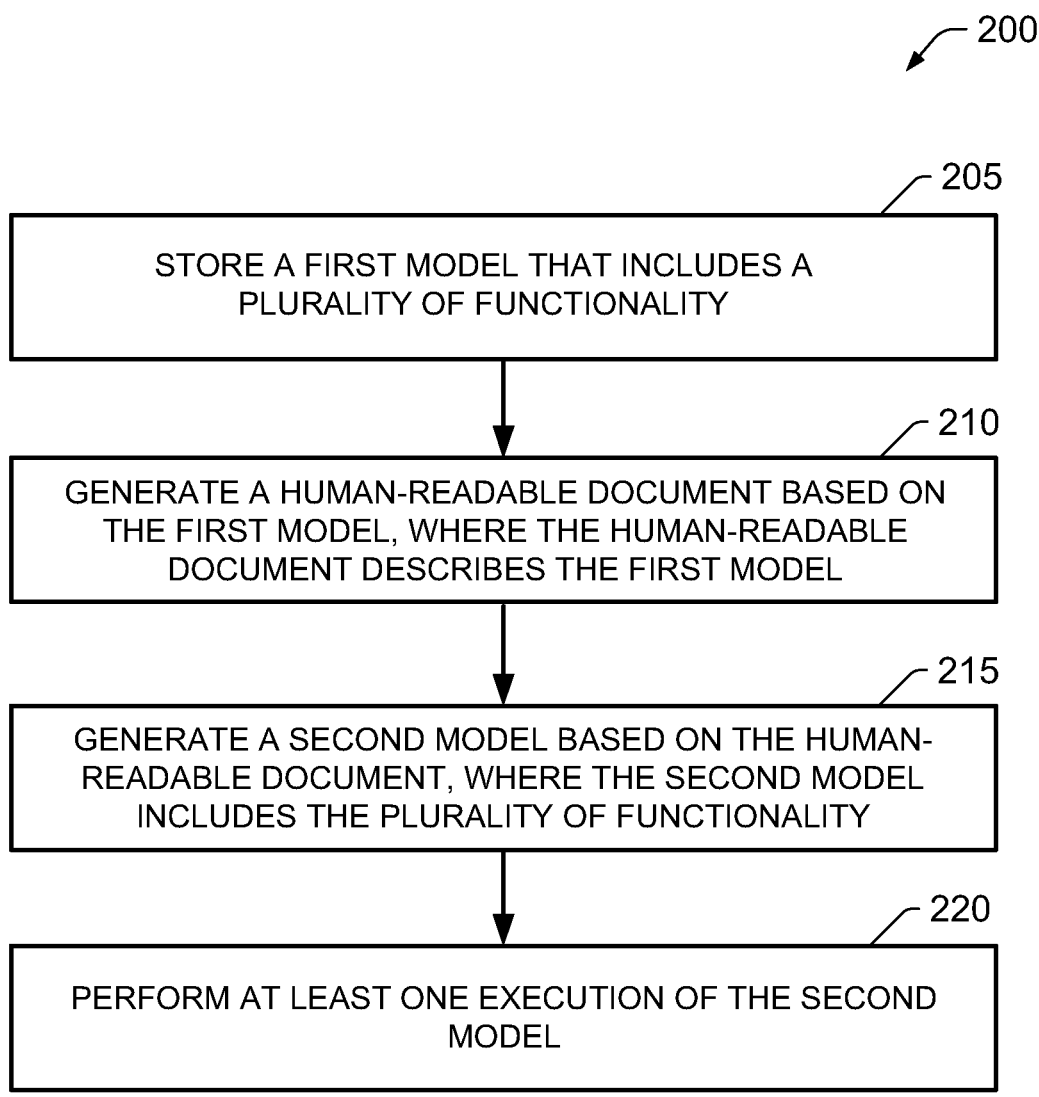
FIG. 2 illustrates a flow chart of an exemplary computer-implemented process for automatically serializing and deserializing models as shown in FIG. 1.

FIG. 2 illustrates a flow chart of an exemplary computer implemented process 200 for automatically serializing and deserializing models using process 100 shown in FIG. 1. Process 200 may be implemented by a computing device, for example serializer 106, deserializer 110 (both shown in FIG. 1) or SD server 310 (shown in FIG. 3). In the exemplary embodiment, SD server 310 may be in communication with at least one user computer device 325 (shown in FIG. 3).

In the exemplary embodiment, SD server 310 may store 205 a first model 102 (shown in FIG. 1). The first model 102 includes a plurality of functionality. SD server 310 may generate 210 a human-readable document 108 (shown in FIG. 1) based on the first model 102. The human-readable document 108 may describe the first model 102. SD server 310 may generate 215 a second model 112 (shown in FIG. 1) based on the human-readable document 108. The second model 112 includes the plurality of functionality. SD server 310 may perform at least one execution of the second model 112.

In some embodiments, serializer 106 may store 205 the first model 102. Serializer 106 may generate 210 human-readable document 108. Deserializer 110 may generate 215 second model 112 (shown in FIG. 1) based on human-readable document 108.

In some embodiments, SD server 310 may receive a plurality of data sets. SD may train the first model 102 based on the plurality of data sets.

In some embodiments, SD server 310 may receive a template 104. SD server 310 may compare the template 104 to the first model 102. SD server 310 may generate the human-readable document 108 based on the comparison. In some of these embodiments, the template 104 may include a plurality of tags. In these embodiments, SD server 310 may compare each tag of the plurality of tags to the first model 102 to identify a feature of the first model 102 that matches the corresponding tag. SD server 310 may apply the feature to at least one location associated with the tag. In some embodiments, SD server 310 stores a plurality of templates 104. Each template 104 is based on a different human-readable document 108. SD server 310 receives a user selection of a template 104 of the plurality of templates 104. SD server 310 may generate the human-readable document 108 based on the user-selected template 104 and the first model 102.

In some further embodiments, SD server 310 may generate the second model 112 based on the template 104 and the human-readable document 108. SD server 310 may identify the features associated with tags based on the template 104. Then SD server 310 may generate the second model 112 to include the features associated with tags and to exclude text not associated with tags.

In some embodiments, SD server 310 may be configured to receive a plurality of data sets and execute the first model 104 based on the plurality of data sets to receive a first plurality of results. SD server 310 may be further configured to execute the second model 112 based on the plurality of data sets to receive a second plurality of results. SD server 310 then may compare the first plurality of results with the second plurality of results to determine an accuracy of the second model 112.

Exemplary Computer Network

Figure 3:
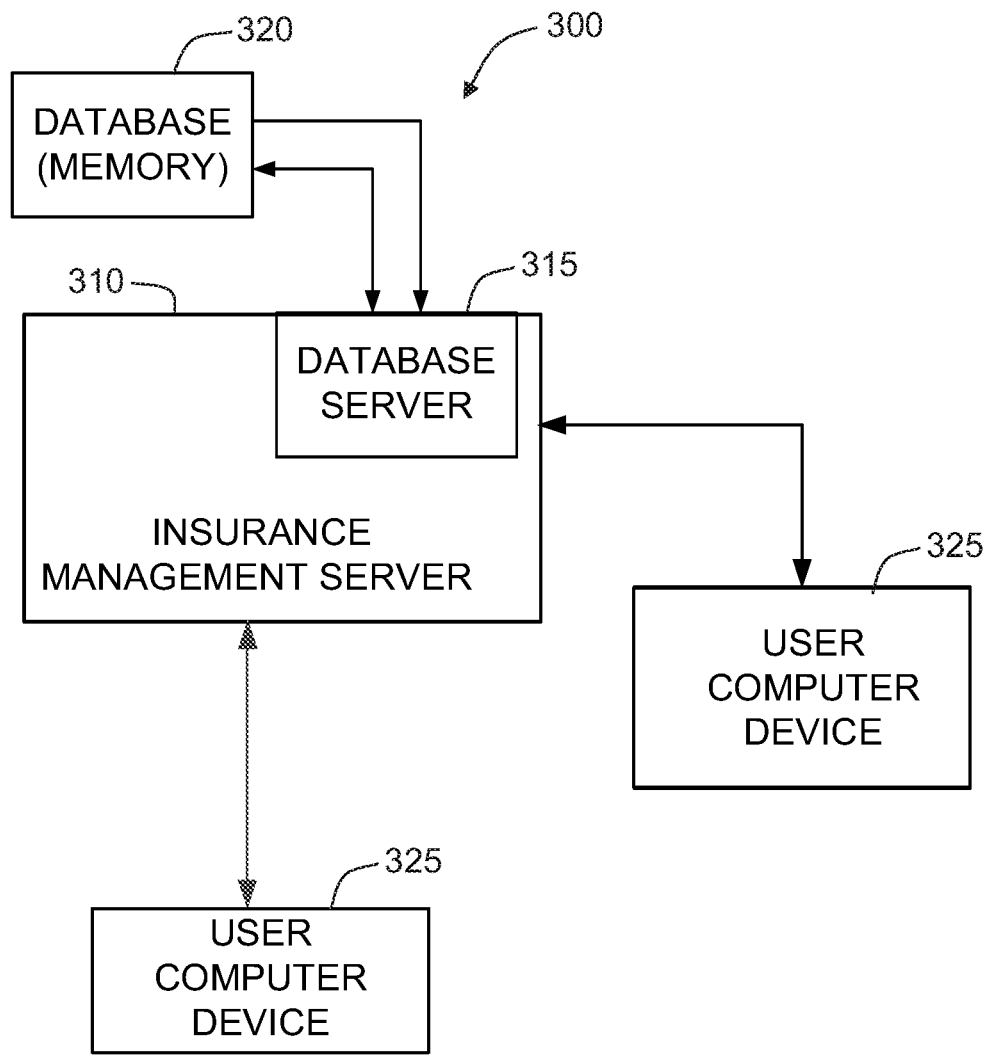
FIG. 3 illustrates a simplified block diagram of an exemplary computer system for implementing the process shown in FIG. 1 and the process shown in FIG. 2.

FIG. 3 depicts a simplified block diagram of an exemplary system 300 for implementing process 100 shown in FIG. 1 and/or process 200 shown in FIG. 2. In the exemplary embodiment, system 300 may be used for automatically serializing and deserializing models. As described below in more detail, a serialization/deserialization ("SD") server 310, which may be a combination of serializer 106 and deserializer 110 (both shown in FIG. 1). SD server 310 may be configured to (i) store a first model 102 (shown in FIG. 1), where the first model 102 includes a plurality of functionality; (ii) generate a human-readable document 108 (shown in FIG. 1) based on the first model 102, where the human-readable document 108 describes the first model 102; (iii) generate a second model 112 based on the human-readable document 108, where the second model 108 includes the plurality of functionality; and (iv) perform at least one execution of the second model 112.

In the exemplary embodiment, user computer devices 325 may be computers that include a web browser or a software application, which enables user computer devices 325 to access remote computer devices, such as SD server 310, using the Internet or other network. More specifically, user computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 315 may be communicatively coupled to a database 320 that stores data. In one embodiment, database 320 may include models (such as Model A 102 and/or Model A' 112), templates 104 (shown in FIG. 1), data sets, and human-readable documents 108. In the exemplary embodiment, database 320 may be stored remotely from SD server 310. In some embodiments, database 320 may be decentralized. In the exemplary embodiment, a user, may access database 320 via user computer device 325 by logging onto SD server 310, as described herein.

SD server 310 may be in communication with a plurality of user computer devices 325 to receive commands to serialize and/or deserialize models and to receive the models 102 to serialize/deserialize. In some embodiments, SD server 310 may be decentralized, where SD server 310 encompasses both serializer 106 and deserializer 110 at separate locations. In other embodiments, SD server 310 acts as both serializer 106 and deserializer 110 at the same location.

Exemplary Client Device

Figure 4:
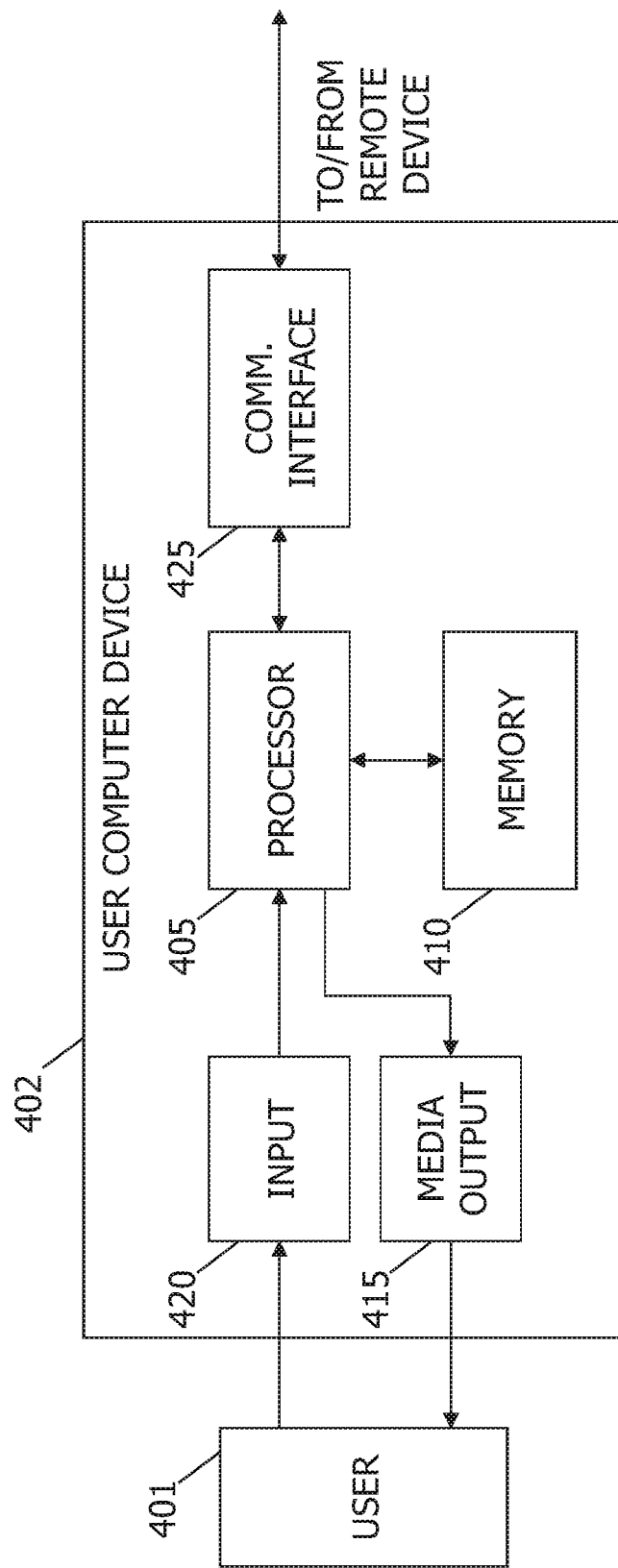
FIG. 4 illustrates an exemplary configuration of a client computer device, in accordance with one embodiment of the present disclosure.

FIG. 4 depicts an exemplary configuration of client computer device, in accordance with one embodiment of the present disclosure. User computer device 402 may be operated by a user 401. User computer device 402 may include, but is not limited to, serializer 106 (shown in FIG. 1), deserializer 110 (shown in FIG. 1), and user computer devices 325 (shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing human-readable document 108 (shown in FIG. 1). In some embodiments, user computer device 402 may include an input device 420 for receiving input from user 401. User 401 may use input device 420 to, without limitation, select a template 104 (shown in FIG. 1) to use.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as SD server 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from SD server 310. A client application may allow user 401 to interact with, for example, SD server 310. For example, instructions may be stored by a cloud service, and the output of the execution of the instructions sent to the media output component 415.

Exemplary Server Device

Figure 5:
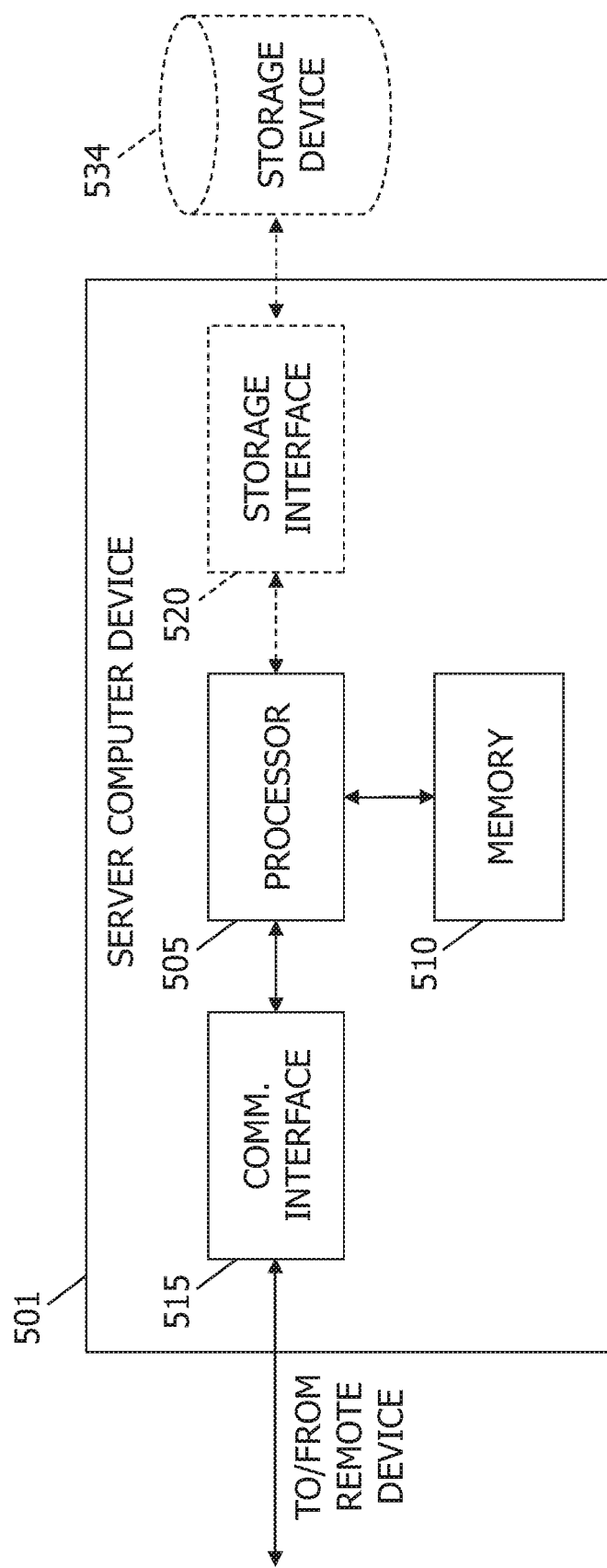
FIG. 5 illustrates an exemplary configuration of a server system, in accordance with one embodiment of the present disclosure.

FIG. 5 depicts an exemplary configuration of server system, in accordance with one embodiment of the present disclosure. Server computer device 501 may include, but is not limited to, serializer 106 (shown in FIG. 1), deserializer 110 (shown in FIG. 1), SD server 310, and database server 315 (both shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, SD server 310, serializer 106, and deserializer 110 (for example, using wireless communication or data transmission over one or more radio links or digital communication channels). For example, communication interface 515 may receive requests from user computer devices 325 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 2.

Exemplary Computer Device

Figure 6:
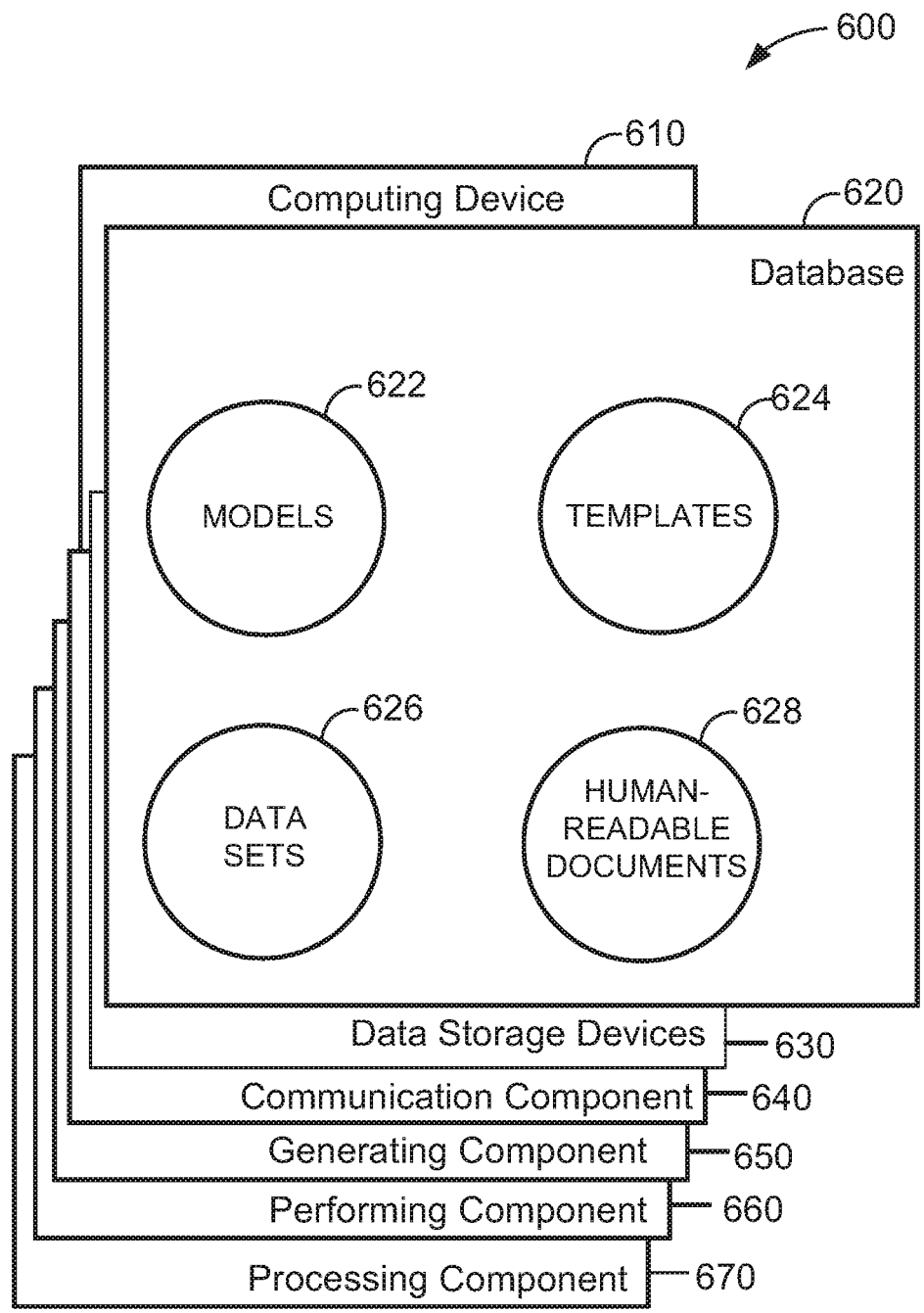
FIG. 6 illustrates a diagram of components of one or more exemplary computing devices that may be used in the process shown in FIG. 1 and the system shown in FIG. 3.

FIG. 6 depicts a diagram 600 of components of one or more exemplary computing devices 610 that may be used to implement process 100 shown in FIG. 1 and system 300 shown in FIG. 3. In some embodiments, computing device 610 may be similar to serializer 106 (shown in FIG. 1), deserializer 110 (shown in FIG. 1), and/or SD server 310 (shown in FIG. 3). Database 620 may be coupled with several separate components within computing device 610, which perform specific tasks. In this embodiment, database 620 may include the models 622 (which may be similar to Model A 102 and/or Model A' 112—both shown in FIG. 1), templates 624 (which may be similar to template 104—shown in FIG. 1), data sets 626, and human-readable documents 628 (which may be similar to human-readable document 108—shown in FIG. 1). In some embodiments, database 620 is similar to database 320 (shown in FIG. 3).

Computing device 610 may include the database 620, as well as data storage devices 630. Computing device 610 may also include a communication component 640. Computing device 610 may further include a generating component 650 for generating 210 a human-readable document and generating 215 a second model (both shown in FIG. 2). Moreover, computing device 610 may include a performing component 660 for performing 220 at least one execution (shown in FIG. 2). A processing component 680 may assist with execution of computer-executable instructions associated with the system.

Exemplary Embodiments & Functionality

In one aspect, a computer system for automatically serializing and deserializing models may be provided. The computer system may include at least one processor in communication with at least one memory device. The at least one processor may be programmed to: (1) store a first model, wherein the first model includes a plurality of functionality; (2) generate a human-readable document based on the first model, wherein the human-readable document describes the first model; (3) generate a second model based on the human-readable document, wherein the second model includes the plurality of functionality; and (4) perform at least one execution of the second model. The system may include additional, less, or alternate functionality, including that discussed elsewhere herein.

In another aspect, a computer-based method for automatically serializing and deserializing models may be provided. The method may be implemented on an serialization/deserialization ("SD") computer device including at least one processor in communication with at least one memory device. The method may include: (1) storing, in the memory device, a first model, wherein the first model includes a plurality of functionality; (2) generating, by the processor, a human-readable document based on the first model, wherein the human-readable document describes the first model; (3) generating, by the processor, a second model based on the human-readable document, wherein the second model includes the plurality of functionality; and (4) performing at least one execution of the second model. The method may include additional, less, or alternate functionality, including that discussed elsewhere herein.

In still another aspect, at least one non-transitory computer-readable storage media having computer-executable instructions embodied thereon is provided. When executed by at least one processor, the computer-executable instructions may cause the processor to: (1) store a first model, wherein the first model includes a plurality of functionality; (2) generate a human-readable document based on the first model, wherein the human-readable document describes the first model; (3) generate a second model based on the human-readable document, wherein the second model includes the plurality of functionality; and (4) perform as least one execution of the second model. The storage media may include additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, documents to be provided, the model being simulated, home owner and/or home, buyer, geolocation information, image data, home sensor data, and/or other data.

Based upon these analyses, the processing element may learn how to identify characteristics and patterns that may then be applied to training models, analyzing sensor data, authentication data, image data, mobile device data, and/or other data.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for serializing and deserializing models, the computer system including at least one processor in communication with at least one memory device and programmed to:
   store a first model having a plurality of functionalities;
   receive a first template having a plurality of placeholders and a plurality of tags;
   identify one or more tags from the plurality of tags by at least comparing the plurality of functionalities in the first model to the plurality of tags in the first template, the one or more identified tags corresponding to the plurality of functionalities;
   generate a human-readable document that describes the first model by at least populating the plurality of placeholders in the first template based upon the one or more tags, the human-readable document describing the plurality of functionalities and is one of a filled out form or a report, the human-readable document being a document separate from the first model;
   generate a second model based upon the human-readable document and the one or more identified tags, the second model having the plurality of functionalities of the first model;
   receive a plurality of data sets;
   execute the first model based upon the plurality of data sets to receive a first plurality of results;
   execute the second model based upon the plurality of data sets to receive a second plurality of results;
   compare the first plurality of results with the second plurality of results to determine an accuracy of the second model; and
   output the human-readable document and the second model;
   wherein the human-readable document is defined by at least one template; and
   wherein the human-readable document includes a plain text description of the first model.

2. The computer system of claim 1, wherein the at least one processor is further programmed to:
   train the first model based upon the plurality of data sets.

3. The computer system of claim 1, wherein the at least one processor is further programmed to:
   compare each tag in the plurality of tags to the plurality of functionalities to identify a functionality that matches a corresponding tag; and
   apply the functionality to at least one location in the first template associated with the corresponding tag.

4. The computer system of claim 1, wherein the at least one processor is further programmed to:

identify one or more functionalities of the plurality of functionalities associated with the plurality of tags based upon the first template; and generate the second model to include the one or more functionalities of the plurality of functionalities associated with the plurality of tags and to exclude other functionalities of the plurality of functionalities not associated with the plurality of tags.

5. The computer system of claim 1, wherein the at least one processor is further programmed to:

store a plurality of templates, each template being based upon a different human-readable document;

receive a user selection of a second template of the plurality of templates; and generate the human-readable document based upon the second template and the first model.

6. A computer-implemented method for serializing and deserializing models, the method comprising:

storing, by a computing device, a first model having a plurality of functionalities;

receiving, by the computing device, a first template having a plurality of placeholders and a plurality of tags;

identifying, by the computing device, one or more tags from the plurality of tags by at least comparing the plurality of functionalities in the first model to the plurality of tags in the first template, the one or more identified tags corresponding to the plurality of functionalities;

generating, by the computing device, a human-readable document that describes the first model by at least populating the plurality of placeholders in the first template based upon the one or more tags, the human-readable document describing the plurality of functionalities and is one of a filled out form or a report, the human-readable document being a document separate from the first model;

generating, by the computing device, a second model based upon the human-readable document and the one or more identified tags, the second model having the plurality of functionalities of the first model;

receiving a plurality of data sets;

executing the first model based upon the plurality of data sets to receive a first plurality of results;

executing the second model based upon the plurality of data sets to receive a second plurality of results;

comparing the first plurality of results with the second plurality of results to determine an accuracy of the second model; and outputting the human-readable document and the second model;

wherein the human-readable document is defined by at least one template; and wherein the human-readable document includes a plain text description of the first model.

7. The computer-implemented method of claim 6, further comprising:

training the first model based upon the plurality of data sets.

8. The computer-implemented method of claim 6, further comprising:

comparing each tag in the plurality of tags to the plurality of functionalities to identify a functionality that matches a corresponding tag; and applying the functionality to at least one location in the first template associated with the corresponding tag.

9. The computer-implemented method of claim 6, further comprising:

identifying one or more functionalities of the plurality of functionalities associated with the plurality of tags based upon the first template; and generating the second model to include the one or more functionalities of the plurality of functionalities associated with the plurality of tags and to exclude other functionalities of the plurality of functionalities not associated with the plurality of tags.

10. The computer-implemented method of claim 6, further comprising:

storing a plurality of templates, each template being based upon a different human-readable document;

receiving a user selection of a second template of the plurality of templates; and generating the human-readable document based upon the second template and the first model.

11. A non-transitory computer-readable storage medium having computer-executable instructions stored thereon, the computer-executable instructions, when executed by at least one processor cause the at least one processor to:

store a first model having a plurality of functionalities;

receive a first template having a plurality of placeholders and a plurality of tags;

identify one or more tags from the plurality of tags by at least comparing the plurality of functionalities in the first model to the plurality of tags in the first template, the one or more identified tags corresponding to the plurality of functionalities;

generate a human-readable document that describes the first model by at least populating the plurality of placeholders in the first template based upon the one or more tags, the human-readable document describing the plurality of functionalities and is one of a filled out form or a report, the human-readable document being a document separate from the first model;

generate a second model based upon the human-readable document and the one or more identified tags, the second model having the plurality of functionalities of the first model;

receive a plurality of data sets;

execute the first model based upon the plurality of data sets to receive a first plurality of results;

execute the second model based upon the plurality of data sets to receive a second plurality of results;

compare the first plurality of results with the second plurality of results to determine an accuracy of the second model; and output the human-readable document and the second model;

wherein the human-readable document is defined by at least one template; and wherein the human-readable document includes a plain text description of the first model.

12. The non-transitory computer-readable storage medium of claim 11, wherein the computer-executable instructions, when executed by the at least one processor, further cause the at least one processor to:

train the first model based upon the plurality of data sets.

13. The non-transitory computer-readable storage medium of claim 11, wherein the computer-executable instructions, when executed by the at least one processor, further cause the at least one processor to:

compare each tag in the plurality of tags to the plurality of functionalities to identify a functionality that matches a corresponding tag; and apply the functionality to at least one location in the first template associated with the corresponding tag.

14. The non-transitory computer-readable storage medium of claim 11, wherein the computer-executable instructions, when executed by the at least one processor, further cause the at least one processor to:
- identify one or more functionalities of the plurality of functionalities associated with the plurality of tags based upon the first template; and
- generate the second model to include the one or more functionalities of the plurality of functionalities associated with the plurality of tags and to exclude other functionalities of the plurality of functionalities not associated with the plurality of tags.

15. The non-transitory computer-readable storage medium of claim 11, wherein the computer-executable instructions, when executed by the at least one processor, further cause the at least one processor to:
- store a plurality of templates, each template being based upon a different human-readable document;
- receive a user selection of a second template of the plurality of templates; and
- generate the human-readable document based upon the second template and the first model.

\* \* \* \* \*